(12) United States Patent
Gordon

(10) Patent No.: US 7,766,255 B2
(45) Date of Patent: Aug. 3, 2010

(54) METHOD AND SYSTEM FOR THE APPLICATION OF LIQUID PESTICIDES

(75) Inventor: Glenn Gordon, Largo, FL (US)

(73) Assignee: Gordon Laboratories, Inc, Largo, FL (US)

( * ) Notice: Subject to any disclaimer, the term of this patent is extended or adjusted under 35 U.S.C. 154(b) by 1114 days.

(21) Appl. No.: 11/431,169

(22) Filed: May 10, 2006

(65) Prior Publication Data

US 2007/0284458 A1  Dec. 13, 2007

(51) Int. Cl.
*A01G 25/09* (2006.01)
*A01G 27/00* (2006.01)
*B05B 9/00* (2006.01)
*B05B 7/02* (2006.01)

(52) U.S. Cl. ............... 239/146; 239/127; 239/145; 239/526

(58) Field of Classification Search ........... 239/548, 239/525, 526, 527, 127, 146, 172, 332, 722; 222/318, 383; 418/104, 131, 201
See application file for complete search history.

(56) References Cited

U.S. PATENT DOCUMENTS

| | | | |
|---|---|---|---|
| 3,248,020 A * | 4/1966 | Spalding | 222/243 |
| 3,516,608 A | 6/1970 | Bowen et al. | |
| 3,575,348 A * | 4/1971 | MacKay | 239/127 |
| 3,727,841 A * | 4/1973 | Hengesbach | 239/145 |
| 4,848,659 A * | 7/1989 | Tadych | 239/127 |
| 5,319,878 A * | 6/1994 | Moffett et al. | 43/124 |
| 2005/0109376 A1 * | 5/2005 | Gregory | 134/22.1 |

* cited by examiner

*Primary Examiner*—Len Tran
*Assistant Examiner*—Justin Jonaitis
(74) *Attorney, Agent, or Firm*—Dennis G. LaPointe

(57) ABSTRACT

A system and method for applying an aqueous pesticide solution comprising a motor and a pump combination wherein the pump is operable in the 1000-3000 pounds per square inch range; a reservoir for holding the solution to be dispersed; a regulator and pressure monitoring gauge; a hose and nozzle system configured to disperse the pesticide solution at a rate of about 1.5 to about 2.5 gallons per minute and to atomize the solution being dispersed into droplets of between 1 to 30 microns, wherein an adhesion property of the dispersed aqueous pesticide solution is significantly enhanced by such configuration, and wherein the solution is hydro-kinetically charged when released from its hydrostatic state as the solution flows through the dispersion nozzle assembly.

14 Claims, 8 Drawing Sheets

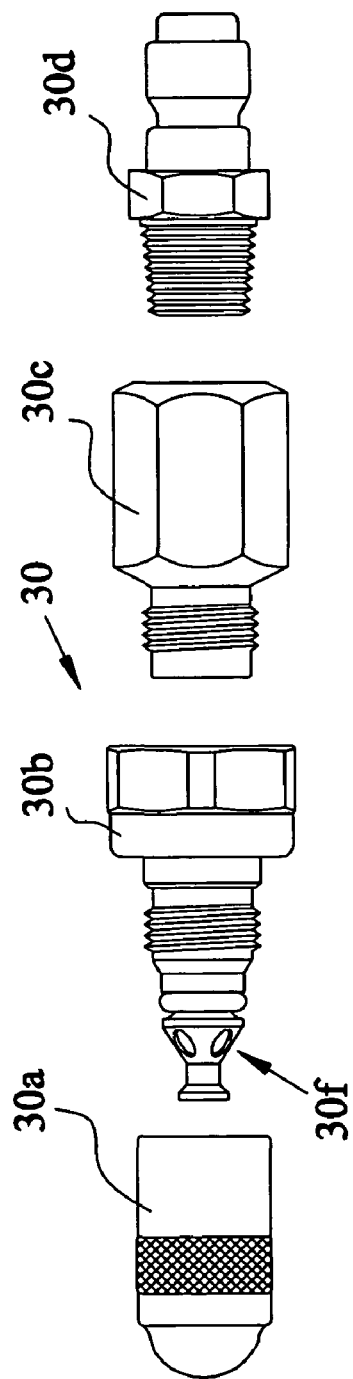
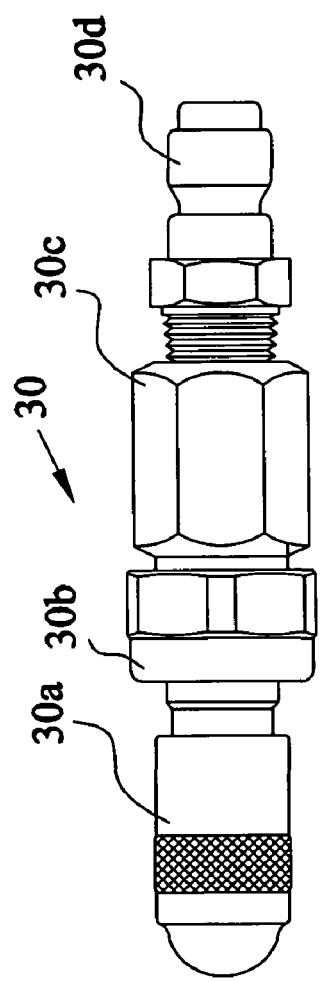
Fig.3a
Fig.3b

METHOD AND SYSTEM FOR THE APPLICATION OF LIQUID PESTICIDES

FIELD OF THE INVENTION

The invention relates to a method and apparatus for the application of liquid pesticides.

BACKGROUND OF THE INVENTION

Traditionally in the structural pest control and agricultural pest control markets, either manually operated or electrically or gas controlled pesticide sprayers, use maximum pressures ranging from 15 to 500 psi with flow rates from 5 gpm to 40 gpm. Or environmental pest control devices such as ultra low volume (ULV) machines, for mosquito and parasitic gnat's control, use low volume such as 1 gallon per hour, mainly using technical materials or liquid concentrates, and self made wind velocities to break down and distribute the pesticides into a cold fog (1-30 microns). These ULV machines do not compress the droplets; they use a venture siphoning system, never energizing the droplet molecules, or they try to artificially induce the energizing of the droplets, by adding an electrical current to the liquid, through the use of adding an electrode to the application tip, for example, see U.S. Pat. No. 3,516,608 to H. D. Bowen et al.

SUMMARY OF THE INVENTION

The invention is a method and system or apparatus for applying liquid pesticides, at high pressure/low volume, thus causing the liquid particles to burst and spread out into 1-30 micron droplets (fog), for the purpose of using the water molecules' natural adhesion to bond it to any molecule with a positive or negative charge, and taking advantage of the liquid's ability to become hydro-kinetically charged after being released from a hydrostatic state.

An example of an embodiment of the system is a system, which is complete with pump, motor, filters, reel & application hose, nozzles (specially designed spray tips), tubing, application gun, built on a portable relatively compact skid mount. Working pressure is 1000-3000 psi (adjustable).

An optimal component setup for this example of a working model using a 5.5 HP, OHV horizontal-shaft engine with electronic ignition with 3.88 quart capacity fuel tank is as listed below.

| | |
|---|---|
| Engine Type | Air-cooled 4-stroke OHV 25° inclined single cylinder |
| Bore x Stroke | 68 × 45 mm |
| Displacement | 163 cc |
| Compression Ratio | 8.5:1 |
| Maximum Power Output | 5.5 HP (4.1 kW)/3,600 rpm |
| Recommended Power Output | 4.8 HP (3.5 kW)/3,600 rpm |
| Maximum Torque | 1.1 kg-m(10.8 Nm)/2,500 rpm |
| Ignition System | Transistorized magneto |
| Starting System | Recoil; Electric/Recoil |
| Fuel Tank Capacity | 3.6 liters |
| Air Cleaner | Semi-dry; Oil bath; Dual; Silent; Cyclone |
| Oil capacity | 0.6 liters |
| Fuel Consumption | 230 g/PS-hr(313 g/kWh) |
| Dimensions (L × W × H) | 312 × 362 × 335 mm |
| Dry Weight | 15 kg |

High Pressure/Low Volume Pump (with an incorporated gear reduction box);
50 gallon holding tank;
Trigger Gun Control with multiple detachable spray tips; and
300 foot high pressure, non-marking ¼ inch hose (e.g. Pac 3000 AU ¼ 1 wire 3000 psi working pressure).

The above is only one example of a working model system. It is understood that those skilled in the art could substitute various components and/or sizes that meet the essential requirements to achieve the operating pressures and dispersion performance described above.

The present invention uses 1000-3000 pounds per square inch (psi) operating pressure (but not restricted to these exact amounts) with a flow rate of about 1½ to 2½ gallons per minute (gpm) caused by the spray tip restrictions.

High-pressure water (1000-3000 psi) reaches the nozzle restriction portion, shooting a liquid jet into specially made application tips, resulting in spraying ranges from large streams to the finest atomization possible, and atomizing water into billions of 1 to 30 micron droplets like those occurring in natural fog. This atomization will greatly enhance the water molecules adhesion properties, when it comes into contact with wood or plant material. This is because water molecules (called dipoles) have an electric "pole" at each end of the molecule, with opposite charges, and because the electrons in the molecule tend to congregate near the oxygen atom and away from the hydrogen atoms. Thus the negative part of one water molecule will attract the positive parts of other, nearby molecules. This is why water falls from the sky as raindrops, and not individual molecules, the molecules are all pulling together. This is called cohesion, which is the term for molecules of a substance sticking together.

Water molecules are not only attracted to each other, but to any molecule with positive or negative charges. When a molecule attracts to a different substance, this is termed adhesion. Think about what happens when you dip one end of a piece of paper towel into a glass of water. The water will climb up the fibers of the paper, getting it wet above the level of the water in the glass. We know gravity is pulling down on the water, so why do they move up? This is because the water molecules' positive and negative charges are attracted to the positive and negative charges in the cellulose molecules in the paper. Thus one purpose of the invention is to break the water molecules down to the smallest microns possible, to disrupt the water molecules natural cohesion properties, and increase their adhesion properties to other positive or negative charged molecules.

Another purpose of the invention is take a liquid pesticide in a pressurized hydrostatic state and by using high pressure, at a low volume, restricted through uniquely designed spray tips, atomize it to the smallest possible microns, and project them at a high rate of speed, thus causing the liquid to become hydro-kinetically charged when released from the pressurized hydrostatic state, and when these hydro-kinetically charged molecules collide into contact with a surface, such as wood or plant life, the vortical water bursts and spreads out, thus causing the surface tension to bond water and become hygroscopic in nature instead of resistant. This hygroscopic function causes the surface to react like a sponge and absorb the atomized liquid molecules at a significantly greater rate.

Another purpose of the invention is the creation of a vortex, from the release of the pressurized, hydrostatic water molecules, through the specially made application tips at (1000-3000 psi). This novel and unique cyclonic phenomenon of vortical fog, allows the applicator to spray past an absorbing surface, and to apply an equal material contact with the opposite side of any planned target. This also allows equal application to any odd angled or irregularly shaped surface that may not have a direct access, that is, application to wooden components of attics, interior and exterior wall voids, and agricultural crops, non-commercially farmed forestry, lawn and ornamental plants, etc.

Size of Water Droplets

The degree of atomization (the size of water droplets) produced by a nozzle can be divided into the ranges shown below, comparing with known droplet diameters for different types of precipitation:

| Type of Precipitation | Size of Droplet (Microns) |
| --- | --- |
| Fog | 1-30 |
| Mist | 30-100 |
| Drizzle | 100-300 |
| Light Rain | 300-1000 |
| Heavy Rain | 1000-5000 |

BRIEF DESCRIPTION OF THE DRAWINGS

In the accompanying drawings:

FIG. 3a is an exploded view of a nozzle assembly used with the present invention;

FIG. 3b is an assembled side view of the components depicted in FIG. 3a;

DETAILED DESCRIPTION OF THE INVENTION

Figure 1:
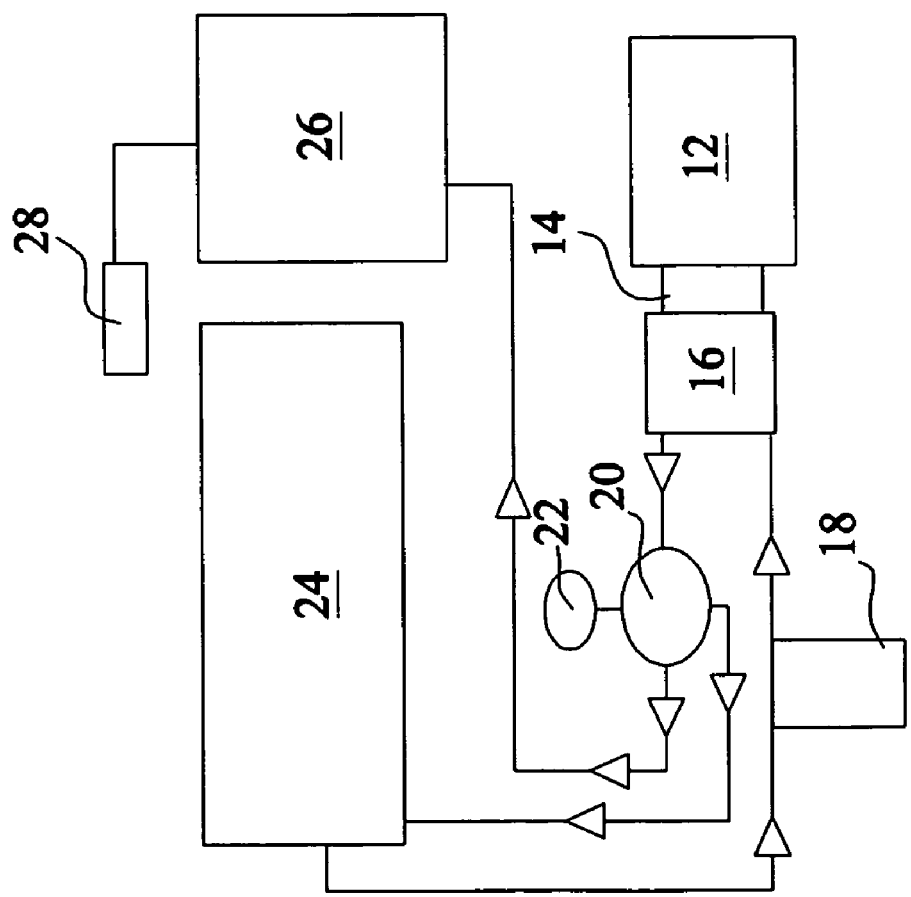
FIG. 1 is a representative conceptual schematic of an example of an inventive system.
Figure 2:
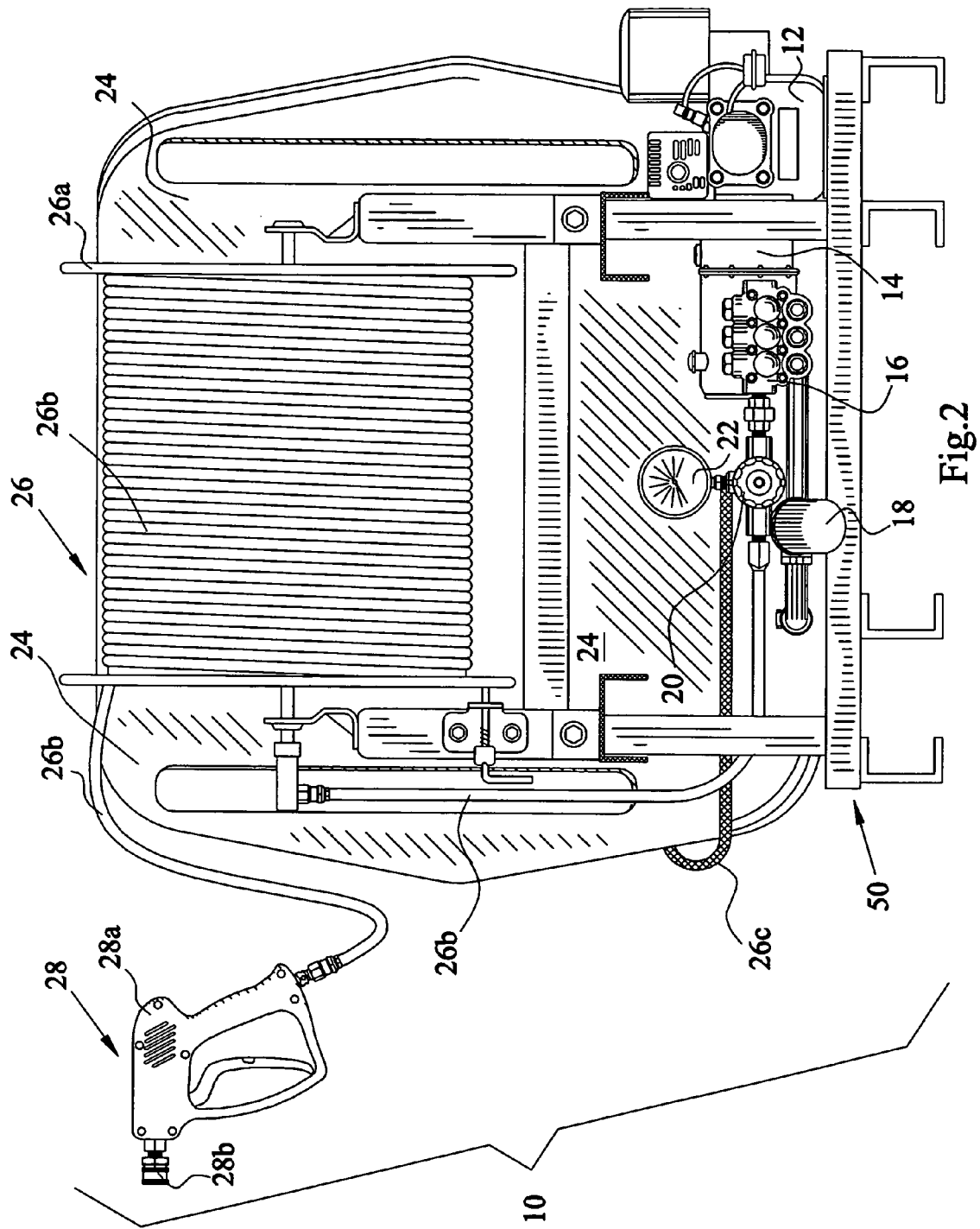
FIG. 2 is a front view of a component arrangement drawing showing the components mounted on a portable skid or platform.

Referring now to the drawings, FIGS. 1 and 2 disclose an example of the present invention system, which is a system and related methodology for the application of a liquid pesticide, and is depicted generally as 10.

The system 10 used for the application of an aqueous pesticide solution comprises a motor 12 and a pump 16 combination wherein the pump is operable in the 1000-3000 pounds per square inch range, and a reservoir 24 for holding said aqueous pesticide solution to be dispersed in fluid communication with the pump 16. In a portable system, the holding tank 24 is anticipated to be about 40-60 gallons in capacity. It is preferred that a gear reduction box or mechanism 14 be coupled between the pump 16 and motor 12.

The system 10 includes means for regulating and monitoring an operating pressure of the system. This is typically a regulator 20 and a pressure gauge 22 for monitoring the operational pressures of the system. As shown in FIG. 2, a screen filter 18 is included upstream of the pump 16.

The system 10 also includes means for dispersing the aqueous pesticide solution, through 30e and 40e, which includes means for restricting a flow rate of the aqueous pesticide solution at a rate of about 1.5 to about 2.5 gallons per minute as desired. The means for dispersing the aqueous pesticide solution is configured so as to atomize the aqueous pesticide solution being dispersed into droplets of between 1 to 30 microns, such that an adhesion property of the dispersed aqueous pesticide solution is significantly enhanced by such configuration, and wherein the dispersed aqueous pesticide solution is hydro-kinetically charged when released from its hydrostatic state as the aqueous pesticide solution flows through 30e and 40e, the means for restricting the flow rate of said aqueous pesticide solution.

The means for dispersing the aqueous pesticide solution includes a spray gun assembly 28 in fluid communication with the means for regulating and monitoring the operating pressure of the system 10. The spray gun assembly 28 includes a spray gun 28a and a detachable nozzle assembly 30, which includes a quick-disconnect fitting 30d and a desired nozzle assembly tip 30a (or quick-disconnect fitting 40c and nozzle tip 40a). In the drawings, an adapter 30c (40b) is inserted between quick-disconnect 30c (40c) and nozzle restriction portion adapter 30b (nozzle tip assembly 40a).

Figure 3C:
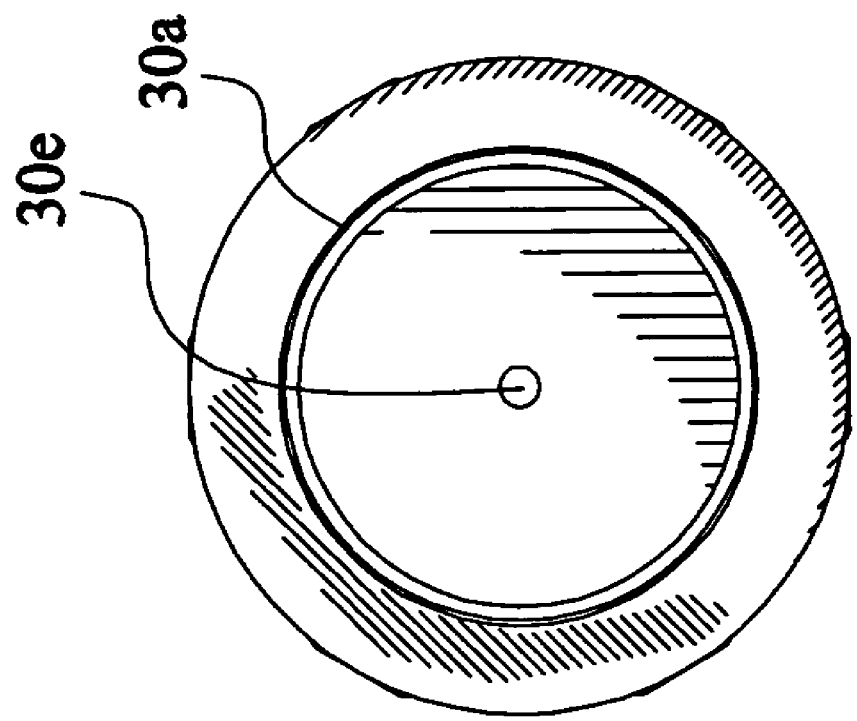
FIG. 3c is an end view of the nozzle tip of FIGS. 3a and 3b showing a centrally located aperture.

In one embodiment as shown in FIG. 3a-3c, the detachable nozzle assembly 30 includes the means for adjustably restricting the flow rate of said aqueous pesticide solution and the means for adjustably restricting the flow rate includes two or more spaced-apart apertures 30f in a nozzle restriction portion 30b, which is in fluid communication with a nozzle tip 30a having a central aperture 30e at its discharge end.

The central aperture 30e at the discharge end of the nozzle tip 30a is preferably at least 1 mm in diameter. The spaced-apart apertures 30f are typically about 3 mm in diameter each and typically, as shown, there are four such apertures 30f.

Figure 3D:
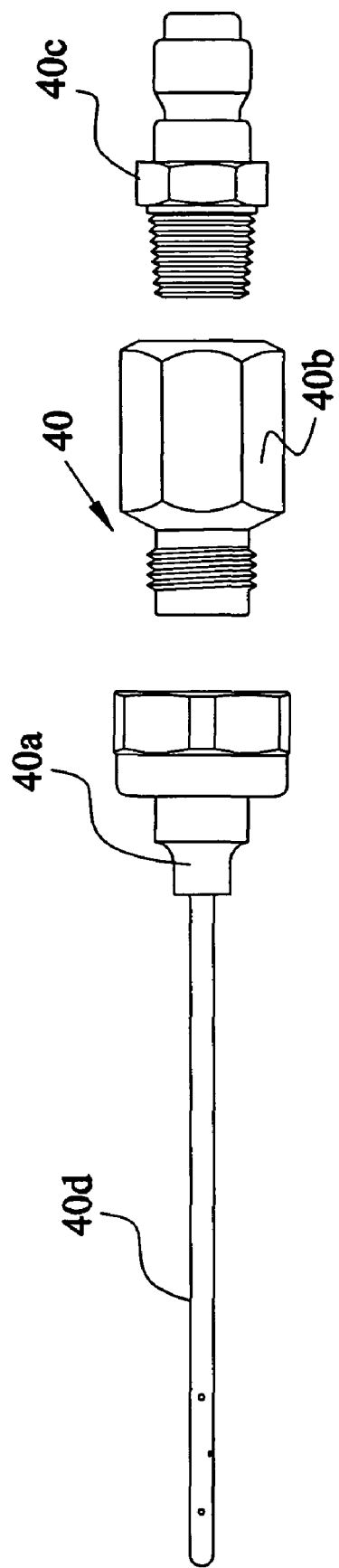
FIG. 3d is an exploded view of the components of another nozzle assembly embodiment used for spraying pesticides.
Figure 3E:
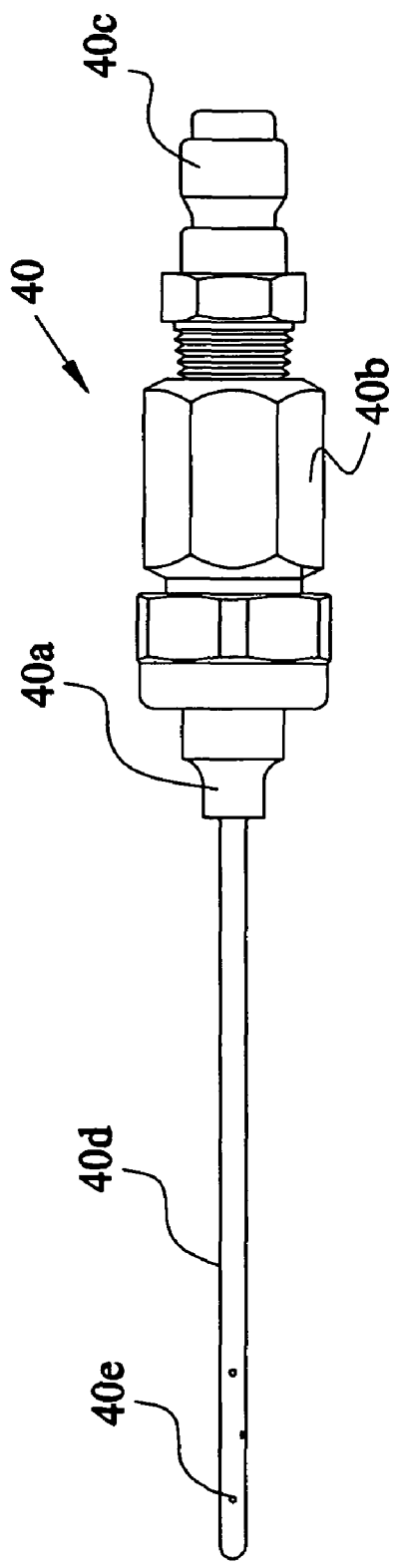
FIG. 3e is an assembled side view of the components depicted in FIG. 3d.
Figure 6:
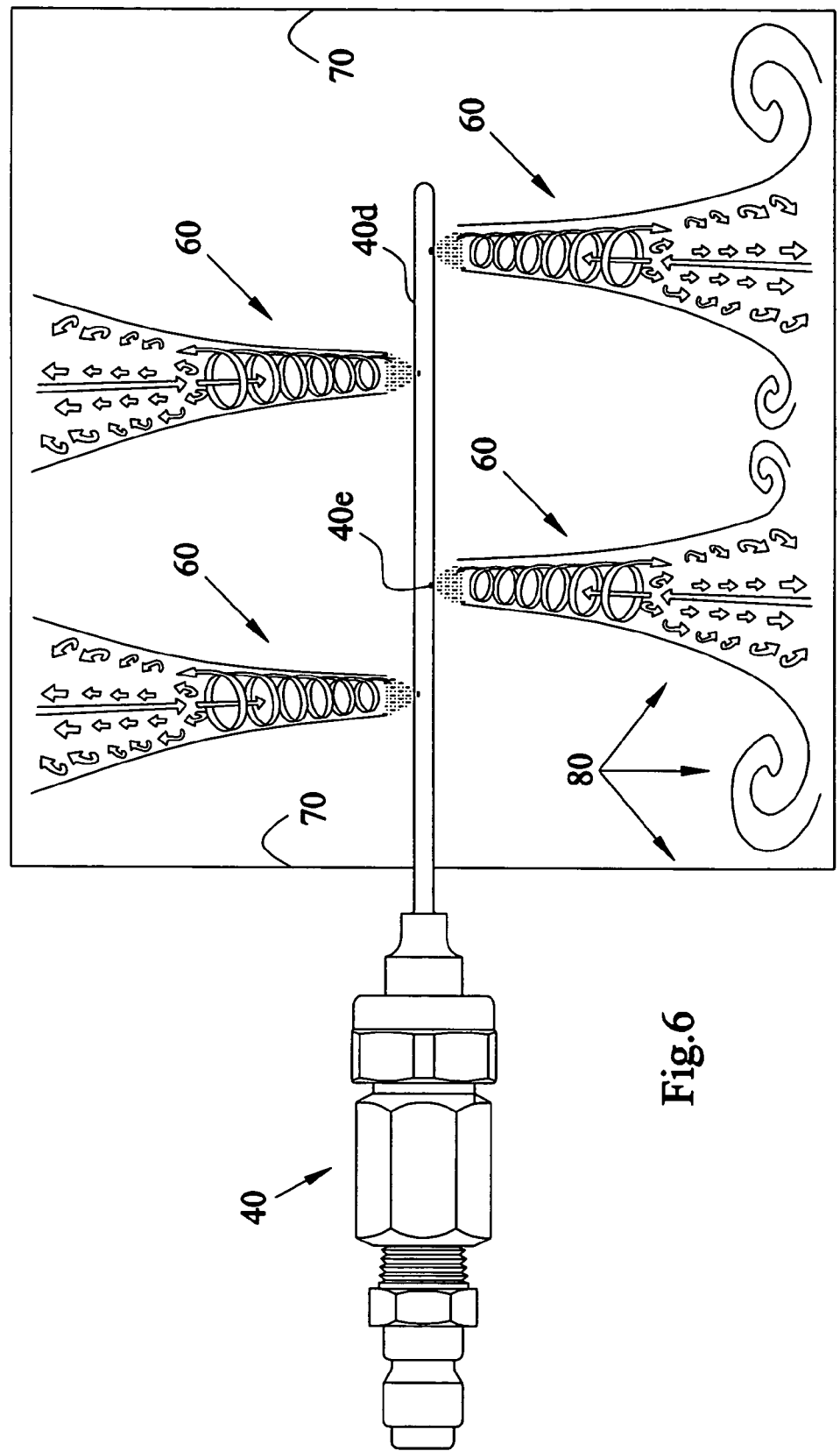
FIG. 6 is a conceptual depiction of the application of the pesticide inside a closed area such as an attic or wall using the applicator of FIGS. 3d-3e.

When the nozzle embodiment of FIGS. 3d and 3e is used, the detachable nozzle assembly 40 includes means for restricting the flow rate of the aqueous pesticide solution and the means for restricting the flow rate comprises a hollow elongate portion 40d having a predetermined length sufficient for inserting through a pre-drilled hole of a building wall (not shown) and spraying the aqueous pesticide solution inside the walls. The elongate portion 40d further comprises a plurality of circumferentially off-set spaced-apart apertures 40e through which a 360 degree, vortical fog of the pesticide solution is sprayed as depicted conceptually with the swirling vortical action depicted as 80 in FIG. 6. This vortical action is shown as two dimensional due to the limitation of a drawing on a flat sheet of paper, but in reality, the action is actually three dimensional and it shoots a 360 degree pattern. The circumferentially off-set spaced-apart apertures 40e are preferably at least 1 mm in diameter. The inside bore (not shown) is typically about 2-4 mm in diameter.

To facilitate portability and handling, the system 10 is preferably assembled and mounted on a skid 50, as shown by way of example in FIG. 2. The frame work of the skid assembly 50 should be configured for compactness, yet allow for easy access of components for maintaining such components. The hose reel assembly 26 including the reel 26a and its hose 26b connected to the tank 24 should be mounted above the skid platform to save in the overall footprint of the system. A return hose 26c is also preferably included to allow for re-circulation capabilities when the spray gun 28a is disengaged or pauses during operation. This will also maintain the solution composition and the pump will not overheat. The hose length is whatever is deemed to provide for most anticipated applications.

The aqueous pesticide solution is sprayed where desired in the atomized state at a desired operating pressure of about 1000 to 3000 psi and at the desired flow rate of said 1.5 to 2.5 gallons per minute.

Figure 4:
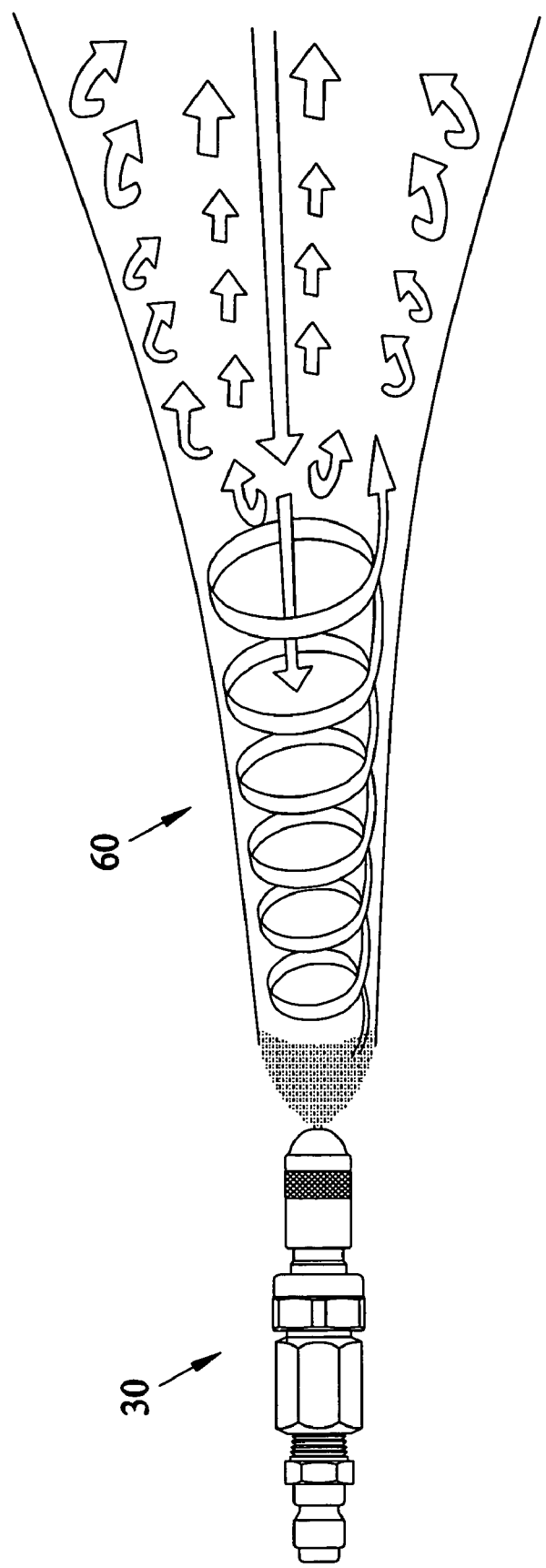
FIG. 4 is a conceptual representation of the creation of a vortex from the release of the pressurized, hydrostatic water molecules through one of the applicator tips.
Figure 5:
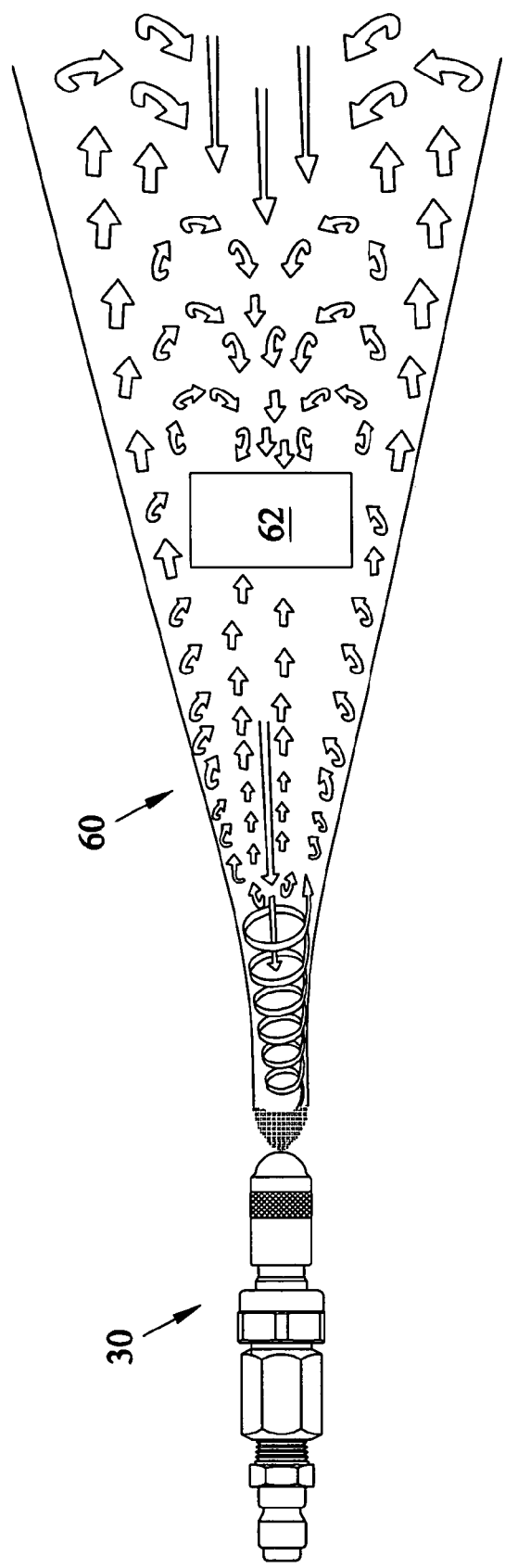
FIG. 5 is a conceptual representation of the creation of a vortex from the release of the pressurized, hydrostatic water molecules through one of the applicator tips as depicted in FIG. 4, with the addition of an obstacle in the spray path.

As noted above and conceptually presented in FIGS. 4-6, another purpose of the invention is the creation of a vortex 60, from the release of the pressurized, hydrostatic water molecules, through the specially made application apertures 30e, 40e at (1000-3000 psi). This novel and unique cyclonic phenomenon of vortical fog, allows the applicator to spray past an absorbing surface, and to apply an equal material contact with the opposite side of any planned target or obstacle represented conceptually by 62 in FIG. 5. This also allows equal application to any odd angled or irregularly shaped surface that may not have a direct access, that is, application to wooden components of attics, interior and exterior wall voids, and agricultural crops, non-commercially farmed forestry, lawn and ornamental plants, etc. The attics and wall voids are conceptually represented in FIG. 6 by numeral 70. The crops, forestry and plants are conceptually represented in FIG. 5 by the obstacle numbered 62.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed is:

1. A method for applying an aqueous pesticide solution comprising:
   providing a system for the application of an aqueous pesticide solution;
   the system comprising:
   a motor and a pump combination wherein said pump is operable in the 1000-3000 pounds per square inch range with a desired flow rate of about 1.5 to about 2.5 gallons per minute;
   a reservoir for holding said aqueous pesticide solution to be dispersed in fluid communication with the pump with an inline filter upstream of said pump for filtering said aqueous pesticide solution flowing from said reservoir to said pump;
   means for regulating and monitoring an operating pressure of the system;
   a spray gun assembly in fluid communication with the means for regulating and monitoring the operating pressure of the system, wherein the spray gun assembly further includes a spray gun and a detachable nozzle assembly and the detachable nozzle assembly includes means for restricting the flow rate of said aqueous pesticide solution and said means for restricting the flow rate comprises a hollow elongate portion having a predetermined length sufficient for inserting through a pre-drilled hole of a building wall and spraying said aqueous pesticide solution inside said walls, the elongate portion further comprising a plurality of circumferentially off-set spaced-apart apertures through which the aqueous pesticide solution is capable of spraying at a 360 degree radius, wherein the circumferentially off-set spaced-apart apertures are at least 1 mm in diameter and the elongate portion has an inside diameter of about 2 to 3 mm in diameter;
   wherein the motor and pump combination operating at said 1000-3000 pounds per square inch range with said desired flow rate of about 1.5 to about 2.5 gallons per minute and said spray gun and detachable nozzle assembly are configured so as to atomize said aqueous pesticide solution being dispersed into droplets of between 1 to 30 microns, wherein an adhesion property of the dispersed aqueous pesticide solution is significantly enhanced by such configuration, and wherein the dispersed aqueous pesticide solution is hydro-kinetically charged when released from its hydrostatic state as said aqueous pesticide solution flows through the means for restricting the flow rate of said aqueous pesticide solution, and
   wherein a vortex is created from a release of the pressurized, hydrostatic aqueous pesticide solution so that a cyclonic phenomenon of vortical fog allows the spray gun said aqueous pesticide solution to spray past an absorbing surface or obstacle, and to apply an equal solution contact with an opposite side of said surface or obstacle and to provide an equal application of said sprayed solution to any odd angled or irregularly shaped surface or desired target that may not have a direct access; and spraying said aqueous pesticide solution where desired in said atomized state at said desired operating pressure of said 1000 to 3000 psi and at said desired flow rate of about ~1.5 to 2.5 about gallons per minute.

2. The method according to claim 1, wherein the motor and pump combination further comprising a gear reduction mechanism in mechanical communication between the motor and pump.

3. The method according to claim 1, further comprising means for re-circulating said aqueous pesticide solution back to the reservoir when said spray gun dispensing said aqueous pesticide solution is paused during operation.

4. The method according to claim 1, wherein the detachable nozzle assembly includes the means for adjustably restricting the flow rate of said aqueous pesticide solution and said means for restricting the flow rate includes two or more spaced-apart apertures in a nozzle restriction portion, which is in fluid communication with a nozzle tip having a central aperture at its discharge end.

5. The method according to claim 4, wherein the central aperture at the discharge end of the nozzle tip is at least 1 mm in diameter.

6. The method according to claim 1, wherein the system is assembled and mounted on a skid for facilitating portability and handling.

7. The method according to claim 1, wherein the system further comprises a hose and reel assembly for spraying at desired distances from the system.

8. A system for applying an aqueous pesticide solution comprising:
   a motor and a pump combination wherein said pump is operable in the 1000-3000 pounds per square inch range with a desired flow rate of about 1.5 to about 2.5 gallons per minute;
   a reservoir for holding said aqueous pesticide solution to be dispersed in fluid communication with the pump with an inline filter upstream of said pump for filtering said aqueous pesticide flowing from said filter to said pump;
   a means for regulating and monitoring an operating pressure of the system;

a spray gun assembly in fluid communication with the means for regulating and monitoring the operating pressure of the system, wherein the spray gun assembly further includes a spray gun and a detachable nozzle assembly and the detachable nozzle assembly includes means for restricting the flow rate of said aqueous pesticide solution and said means for restricting the flow rate comprises a hollow elongate portion having a predetermined length sufficient for inserting through a pre-drilled hole of a building wall and spraying said aqueous pesticide solution inside said walls, the elongate portion further comprising a plurality of circumferentially off-set spaced-apart apertures through which the aqueous pesticide solution is capable of spraying at a 360 degree radius, wherein the circumferentially off-set spaced-apart apertures are at least 1 mm in diameter and the elongate portion has an inside diameter of about 2 to 3 mm in diameter;

wherein the motor and pump combination operating at said 1000-3000 pounds per square inch range with said desired flow rate of about 1.5 to about 2.5 gallons per minute and said spray gun and detachable nozzle assembly are configured so as to atomize said aqueous pesticide solution being dispersed into droplets of between 1 to 30 microns, wherein an adhesion property of the dispersed aqueous pesticide solution is significantly enhanced by such configuration, and wherein the dispersed aqueous pesticide solution is hydro-kinetically charged when released from its hydrostatic state as said aqueous pesticide solution flows through the means for restricting the flow rate of said aqueous pesticide solution, and wherein a vortex is created from a release of the pressurized, hydrostatic aqueous pesticide solution so that a cyclonic phenomenon of vortical fog allows the means for dispersing said aqueous pesticide solution to spray past an absorbing surface or obstacle, and to apply an equal solution contact with an opposite side of said surface or obstacle and to provide an equal application of said sprayed solution to any odd angled or irregularly shaped surface or desired target that may not have a direct access.

9. The system according to claim 8, wherein the motor and pump combination further comprising a gear reduction mechanism in mechanical communication between the motor and pump.

10. The system according to claim 8, further comprising means for re-circulating said aqueous pesticide solution back to the reservoir when said spray gun dispensing said aqueous pesticide solution is paused during operation.

11. The system according to claim 8, wherein the detachable nozzle assembly includes the means for adjustably restricting the flow rate of said aqueous pesticide solution and said means for restricting the flow rate includes two or more spaced-apart apertures in a nozzle restriction portion, which is in fluid communication with a nozzle tip having a central aperture at its discharge end.

12. The system according to claim 11, wherein the central aperture at the discharge end of the nozzle tip is at least 1 mm in diameter.

13. The system according to claim 8, wherein the system is assembled and mounted on a skid for facilitating portability and handling.

14. The system according to claim 8, wherein the system further comprises a hose and reel assembly for spraying at desired distances from the system.

* * * * *